May 17, 1938.   F. W. LINDBLOM   2,117,436

SPECTACLE TEMPLE MOUNTING

Filed April 14, 1936

INVENTOR.
Frank W. Lindblom
BY Barlow & Barlow
ATTORNEYS.

Patented May 17, 1938

2,117,436

UNITED STATES PATENT OFFICE 2,117,436

SPECTACLE TEMPLE MOUNTING

Frank W. Lindblom, Cranston, R. I., assignor to Welsh Manufacturing Company, a corporation of Rhode Island Application April 14, 1936, Serial No. 74,297

2 Claims. (Cl. 88—53)

This invention relates to a spectacle; and has for one of its objects the provision of a simple and yet quickly assembled mounting for the temple of a spectacle.

Another object of the invention is the provision of means for mounting a spectacle temple without the use of a pin or screw extending through the outwardly extending lug on the rim or the like.

Another object of the invention is the provision of a temple mounting which will have friction applied to its pivotal mounting so that the temple may be held in different positions with relation to the front of the spectacle.

Another object of the invention is the provision of an arrangement so that the temple may be positioned between outwardly extending lugs and a clip positioned over the lugs to hold the temple in the desired assembled pivotally related position and the rim in clamped position about the lens.

With these and other objects in view, the invention consists of certain novel features of construction, as will be more fully described, and particularly pointed out in the appended claims.

Figure 1:
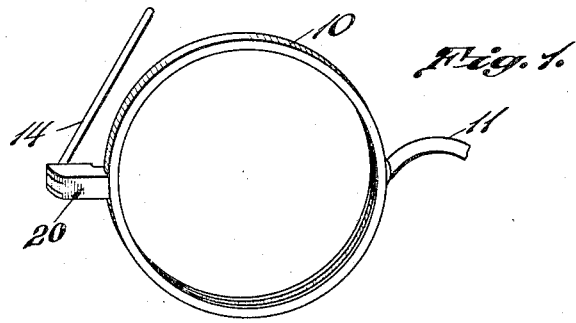
Fig. 1 is a perspective view of a portion of a spectacle showing a fragmental portion of the temple as extending therefrom.

In spectacles, it is usual to mount the temple pivotally on the lens rim by passing a pin through the outwardly-extending lugs provided on the rim which necessitates piercing the lugs or threading one of them where a threaded pin is used. This pin itself serves as a pivot or serves to hold the lugs in their desired related position; and in order to simplify the mounting of a temple in a spectacle, I form an integral stud on one of the lugs to extend partly into an opening in the temple and then provide a clip of a resilient nature which may be sprung over the lugs to hold them in the desired position and at the same time exert sufficient pressure on the lugs so as to force them together to friction or tension the pivotal mounting of the temple in its movement; and the following is a more detailed description of the present embodiment of this invention, illustrating the preferred means by which these advantageous results may be accomplished:

With reference to the drawing, 10 designates one of the lens rims and 11 the bridge piece for connecting these lens rims at their nasal edge.

In the construction here illustrated, the end portions of each lens rim are bent to form outwardly-extending terminal portions or lugs 12 and 13 between which the temple designated generally 14 has its end portions located.

Figure 2:
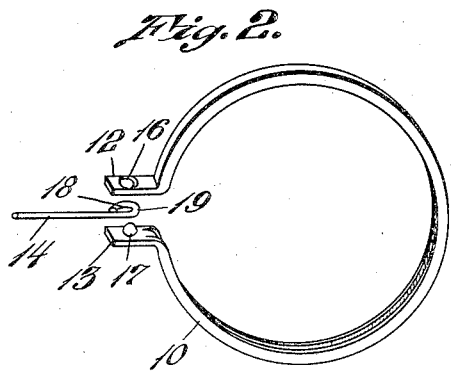
Fig. 2 is a perspective view of one of the lens rims showing the lugs as extending outwardly therefrom.
Figure 3:
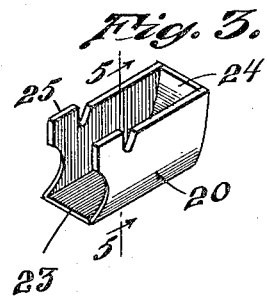
Fig. 3 is a perspective view of the clip.
Figure 4:
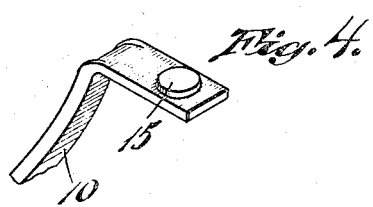
Fig. 4 is a perspective view of a fragmental portion of the rim showing the inner side of one of the lugs.
Figure 5:
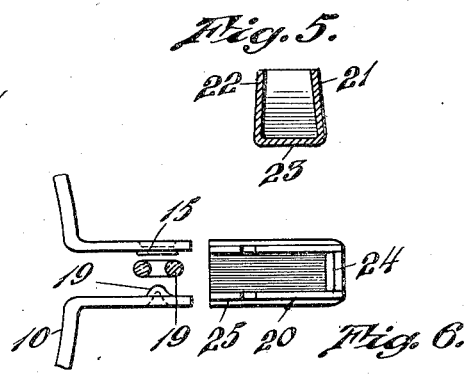
Fig. 5 is a sectional view through the clip, showing the converging side walls.

The lug 12 is struck in such a manner as to provide an abutment portion 15 along its surface which is toward the companion lug 13, this being conveniently formed by striking this lug so as to depress its opposite outer surface, as shown at 16, Fig. 2. This surface 15 forms an abutment of a size sufficient to engage the end of the temple 14 along the outer area which lies between the lugs.

Figure 6:
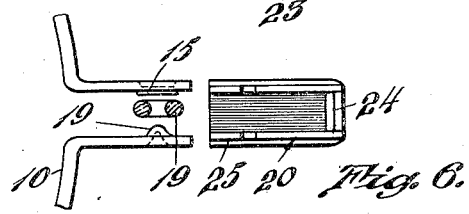
Fig. 6 is an enlarged view partly in section with the clip spaced from the lug just before the assembly of the parts is completed.

The lug 13 is provided with a stud 17 which is raised on the surface toward the companion lug 12 and is conveniently formed by striking the lug 13 to indent its outer surface and raise its inner surface, as shown more particularly in Fig. 6.

Figure 7:
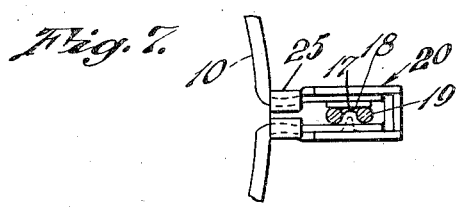
Fig. 7 is a view similar to Fig. 6 with the clip mounted in finished position.

The temple 14 is provided with an opening or recess 18 which is here formed by the round wire of the temple 14, being rolled into the form of an eye 19 providing the opening 18 extending through it, which opening is of a size to receive the mound-shaped stud 17 on the lug 13. This stud, however, does not extend completely through the opening 18, but extends thereinto sufficiently to form a pivot, as clearly shown in Fig. 7, while the surface about the stud engages one side of the eye on the end of the temple, and the abutment surface 15, which is in substantially a single plane, engages the opposite side of the eye 19 so that when pressure is brought to bear upon the lugs tending to force them together, these lugs will frictionally grip the temple.

A housing clip 20 consists of opposite side walls 21 and 22 joined by a wall 23, the relation of the walls being such that the walls 21 and 22 converge toward each other. The stock of the housing is of a resilient or springy nature so that if the walls spread apart the inherent tension of the stock would tend to move them toward each other again to elastically grip anything forced between them to spread the walls. An end wall 24 completes the housing clip.

This housing 20 is adapted to be sprung over the lugs 12 and 13 by slightly spreading the walls 21 and 22 so that the lugs are forced toward each other to resiliently grip and pivotally mount the temple between them while at the same time housing and completely hiding them from view from the front, as shown in Fig. 1, the temple extending rearwardly from the open side of the clip to permit it to have swinging movement with reference to the rim and be held in adjusted position by the friction exerted on the eye 19.

Ears 25 are provided on the housing clip to be rolled inwardly toward each other adjacent the rim at its juncture with the lugs so as to lock this housing clip in position.

The foregong description is directed solely towards the construction illustrated, but I desire it to be understood that I reserve the privilege of resorting to all the mechanical changes to which the device is susceptible, the invention being defined and limited only by the terms of the appended claims.

I claim:

1. In a spectacle, a lens rim provided with outwardly-extending lugs, a temple having a portion with an opening therein located between said lugs, a stud on one lug extending into and only partially through said opening, a raised abutment on the other lug to engage the opposite side of the temple, and resilient means engaging said lugs and urging them toward each other to resiliently grip and pivotally mount said temple.

2. In a spectacle, a lens rim provided with outwardly-extending lugs, a temple having a portion with an opening therein located between said lugs, a fixed stud on one lug extending into and only partially through said opening, and a housing having resilient walls engaging said lugs and urging them toward each other to resiliently grip and maintain said stud in position to pivotally mount said temple whereby the temple is also frictioned to hold it in adjusted position in its mounting, said housing walls extending the entire length of said lugs in the front, top and bottom thereof and also across the outer end to encase the same.

FRANK W. LINDBLOM.